Nov. 29, 1966  P. P. NAZIR  3,288,400
FLIGHT VEHICLE
Filed Sept. 29, 1964  3 Sheets-Sheet 1
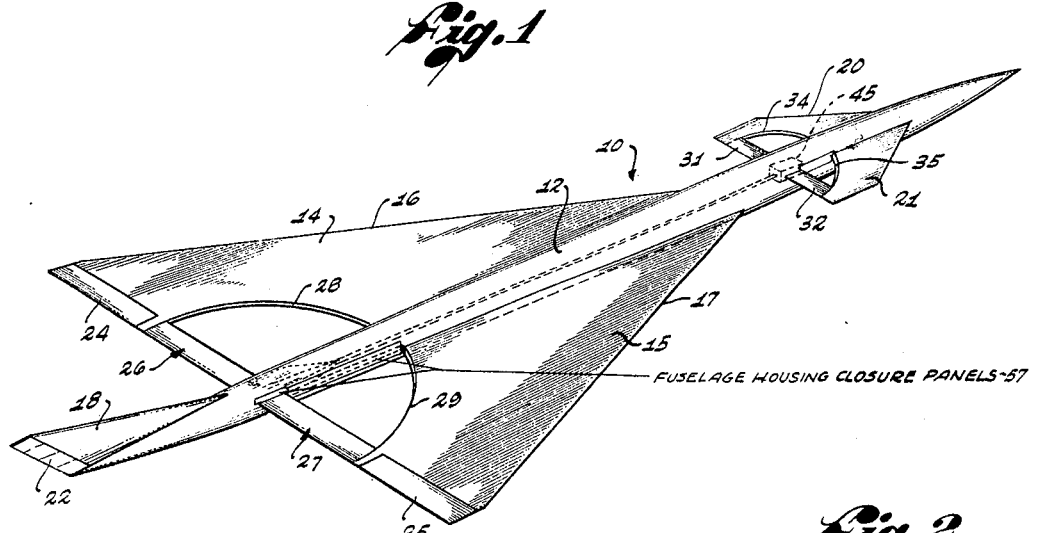
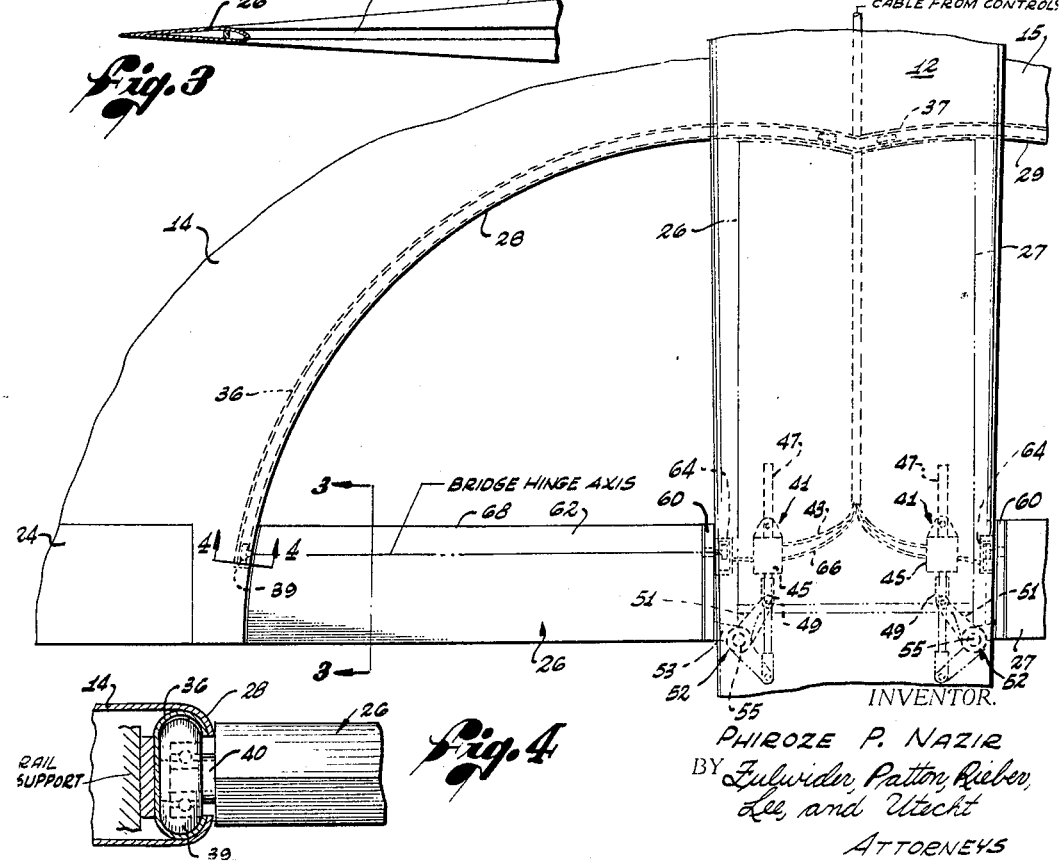
INVENTOR.
PHIROZE P. NAZIR
BY Fulwider, Patton, Rieber,
Lee, and Utecht
ATTORNEYS

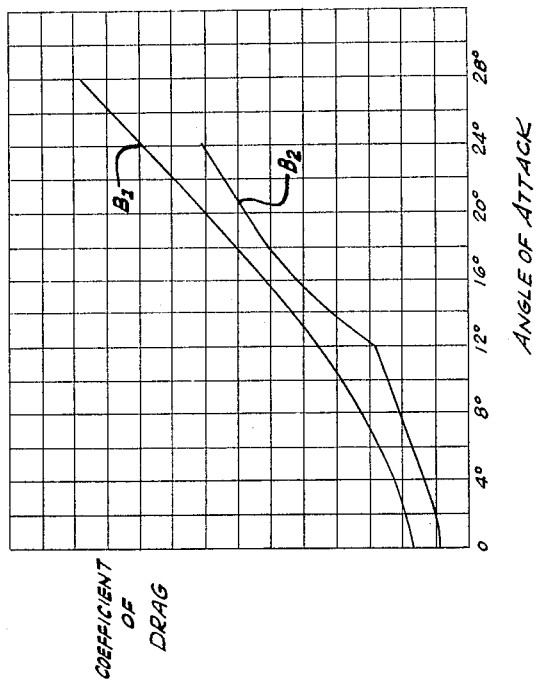
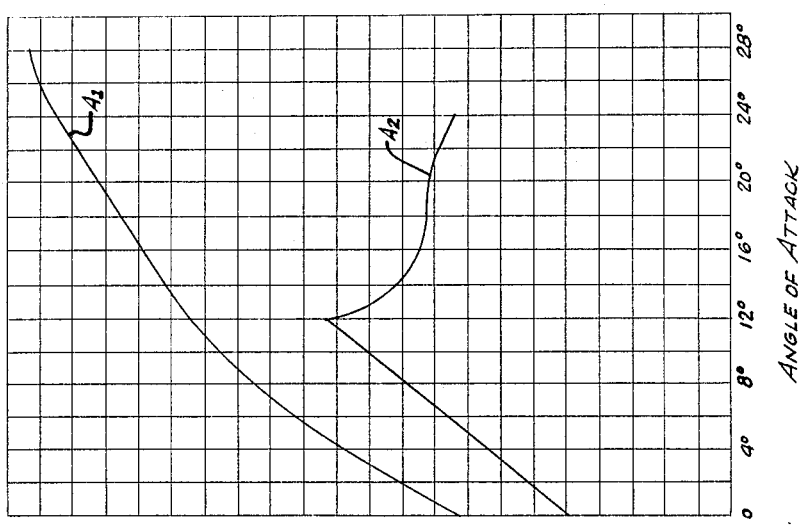

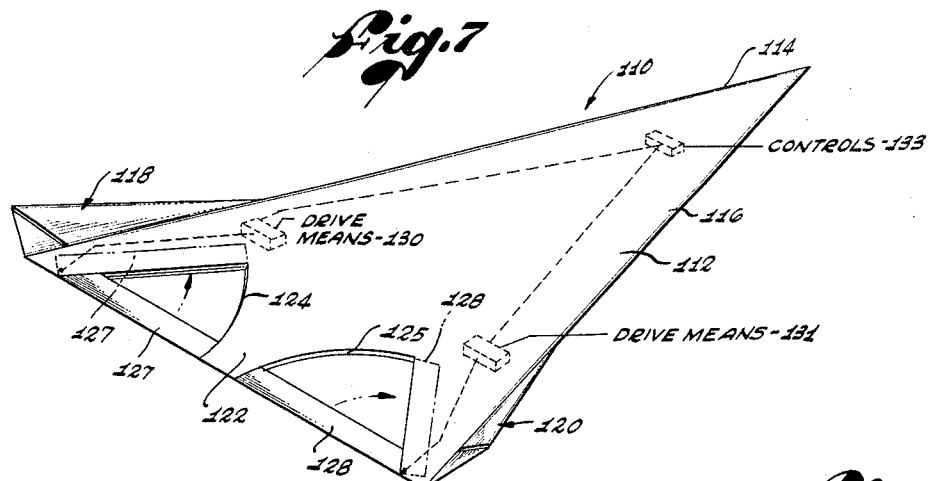
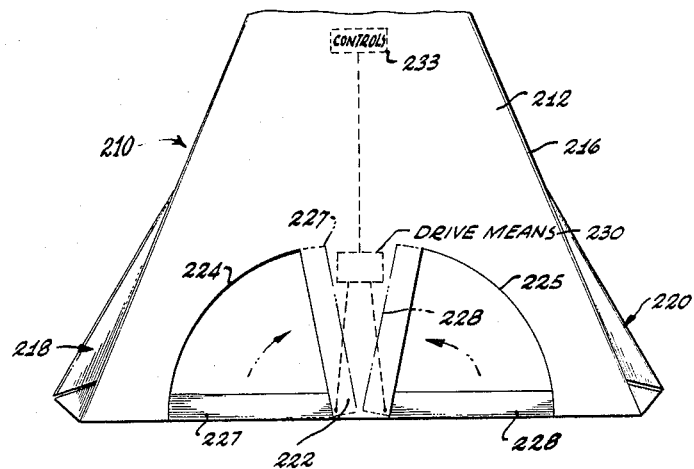
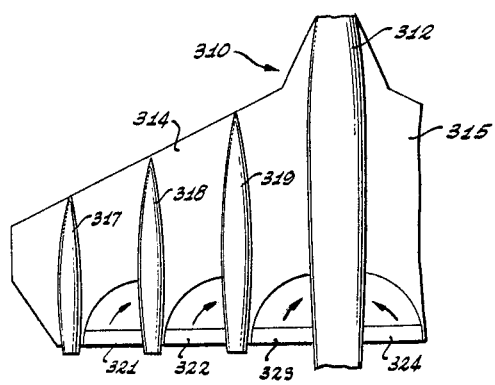

United States Patent Office 3,288,400
Patented Nov. 29, 1966

3,288,400
FLIGHT VEHICLE
Phiroze P. Nazir, 1020 S. Granville Ave.,
Los Angeles, Calif.
Filed Sept. 29, 1964, Ser. No. 400,147
14 Claims. (Cl. 244—43)

This invention relates generally to improvements in flight vehicles, and more particularly to a new and improved airframe construction enabling enhanced low speed aerodynamic performance of flight vehicles designed primarily for operation at high velocities, e.g., above the speed of sound.

In recent years, there has been an ever increasing quest for improved aircraft designs for flight vehicles of both the commercial and military types adapted for primary flight operation at velocities above the speed of sound, but which can also perform well at relatively low subsonic velocities. Unfortunately, however, there is generally considerable incompatibility between airframe designs for optimum supersonic performance and airframe designs for optimum subsonic performance. The term "supersonic" is used throughout this specification to generically designate all vehicle velocities above the speed of sound and is deemed to include the hypersonic or ultrasonic velocity ranges as well as the conventionally defined supersonic velocity range.

Whereas high lift and drag are usually essentially in a subsonic craft, too much lift and drag can provide detrimental to performance at higher vehicle velocities and, hence, supersonic airframes are usually desgined to minimize lift and drag. In this connection, designers of supersonic flight vehicles typically resort to low aspect ratio, sweptback wing designs, such as delta wings and the like.

It will be appreciated that, while subsonic craft usually operate solely at subsonic velocities and can therefore be optimized for performance in that velocity range, supersonic craft must inherently be capable of performance at velocities both above and below the speed of sound. The reason for this is that, while supersonic craft operate primarily at supersonic cruising speeds, landing and takeoff operations must be performed at subsonic speeds. Moreover, in the event of loss of propulsive power due to engine failure, vehicle velocity rapidly diminishes to subsonic levels and terminal gliding flight following power cut-off is carried out primarily in the subsonic velocity range. Therefore, some compromise is usually made in the design of supersonic flight vehicles to enable them to perform adequately at relatively low subsonic speeds. As previously indicated, however, there is a limit to the amount of lift and drag that can be designed into a flight vehicle and still allow that vehicle to perform well at supersonic speeds. Hence, supersonic craft must generally land at a relatively high speed and angle of attack in order to obtain the required degree of lift and drag. The increased danger of mishap incurrend by such high speed landings will be readily apparent. Moreover, because of highlanding speeds, it has sometimes been necessary to resort to high power reverse thrust arrangements to slow the flight vehicle down after runway touchdown. In addition, the relatively high angle of attack not only increases the risk of stalling the craft during landing, but also results in a fuselage attitude tending to obscure the pilot's view of the runway.

Similarly, supersonic flight vehicles require extremely high ground speeds to obtain the necessary lifting force for takeoff. Consequently, the power requirements for such vehicles during takeoff have always been very high. In addition, the relatively high speeds required for takeoff and landing of supersonic aircraft have generally necessitated the use of relatively long runways.

A number of attempts have been made by workers in the art to design supersonic flight vehicles capable of varying their airframe geometry for selectively tailoring the aerodynamic lift and drag characteristics to suit the particular requirements of both supersonic and supersonic flight conditions, e.g., wings capable of variable sweepback and a fuselage nose which is lowered relative to the remainder of the fuselage during landing to improve runway visibility. However, such design approaches have generally been plagued by problems of cost, complexity and stability. Hence, a long recognized need still remains for improved flight vehicles capable of performing well at velocities both above and below the speed of sound. The present invention fulfills this need.

Accordingly, it is an object of the present invention to provide a new and improved flight vehicle which overcomes the above and other disadvantages of the prior art.

Another object is to provide a new and improved supersonic flight vehicle capable of enhanced subsonic performance with substantially no sacrifice in supersonic performance.

A further object of this invention is the provision of novel means for selectively improving the lift and drag characteristics and increasing the stall angle of high speed flight vehicles when operating at relatively low flight velocities, as during landing, takeoff and climb phases of flight operation.

Still another object is to provide a new and improved supersonic flight vehicle embodying means for enhancing the subsonic performance of the flight vehicle and also reducing drag at vehicle velocities above the speed of sound.

Yet another object of the present invention is the provision of a new and improved flight vehicle with enhanced stability and control.

A still further object is to provide a new and improved flight vehicle with reduced power requirements for landing and takeoff.

Another object of the present invention is the provision of a new and improved flight vehicle capable of landing and taking off at lower speeds and on shorter runways.

A further object of this invention is to provide a new and improved flight vehicle utilizing relatively simple, reliable and economical means for selectively varying the aerodynamic performance characteristics of a sweptback wing to meet the changing operational requirements for takeoff, climbing, cruising, gliding and landing.

Still another object of this invention is to provide a flight vehicle embodying new and improved means for minimizing loss of lift due to trailing edge separation of flow over lifting surfaces at subsonic speeds.

A still further object is the provision of a new and improved flight vehicle capable of obtaining higher lift with a small area wing.

Still another object is to provide a new and improved supersonic flight vehicle capable of landing in an attitude providing enhanced runway visibility for the pilot of the vehicle.

The above and other objects and advantages of this invention will become apparent from the following description, when taken in conjunction with the accompanying drawings of illustrative embodiments thereof, and wherein:

FIGURE 1 is a partially schematic, perspective view of a flight vehicle in accordance with the present invention, and illustrates retractable bridge members defining a closed perimeter gap behind the trailing edge of each lifting surface;

FIGURE 2 is an enlarged, fragmentary plan view of a portion of the fuselage and one wing trailing edge of the flight vehicle shown in FIGURE 1, and illustrates one manner in which the position of the trailing edge bridge member may be varied;

FIGURE 3 is a fragmentary sectional view, taken along the line 3—3 in FIGURE 2, and illustrates the airfoil cross-section of the retractable bridge member and the wing;

FIGURE 4 is an enlarged sectional view, taken along the line 4—4 in FIGURE 2, and illustrates the manner in which the retractable bridge member is guided for movement along the trailing edge of the wing;

FIGURE 5 shows a pair of experimentally determined lift curves illustrating the increased lift selectively obtainable with flight vehicles constructed in accordance with the present invention;

FIGURE 6 shows a pair of experimentally determined drag curves illustrating the increased drag selectively obtainable with flight vehicles constructed in accordance with the present invention;

FIGURE 7 is a partially schematic, perspective view of another embodiment of a flight vehicle in accordance with the present invention;

FIGURE 8 is a fragmentary, plan view of a third embodiment of a flight vehicle in accordance with the present invention; and FIGURE 9 is a fragmentary, plan view of a fourth embodiment of a flight vehicle in accordance with the present invention.

Briefly, and in general terms, the foregoing objectives are achieved by providing a retractable bridge member to form a closed perimeter gap behind the trailing edge of a high speed airfoil at lower vehicle velocities. The size of the closed perimeter gap is such that the trailing edge separation of flow over the lifting surface ahead of the bridge member is delayed. Consequently, the bridge member not only adds its own localized lift and drag, but also substantially increases the lift and drag of the neighboring airfoil surface area directly ahead of it. Furthermore, it has been empirically determined that such an airframe configuration delays the stall angle substantially, so that additional lift and drag are also obtainable by virtue of permissible operation at higher angles of attack.

During normal high speed operation, the bridge member is retracted to a storage position within any suitable portion of the flight vehicle, such as the fuselage or the wing. Hence, the bridge member is removed from the outside airstream and cannot in any way impair the high speed aerodynamic performance characteristics of the flight vehicle. In this connection, the retractable bridge member enables the use of a wing with less lifting area and with reduced wing chord where the wing meets the fuselage at its root. The latter results in even less drag at extremely high, e.g., supersonic, speeds than conventional high speed airframe designs.

Referring now to the drawings, and particularly to FIGURE 1 thereof, there is shown a new and improved flight vehicle 10 in accordance with the present invention. The vehicle 10 comprises a fuselage 12 and a pair of wings, 14, 15 extending from the fuselage on opposite sides thereof. The wings 14, 15 provide the primary lifting surfaces for the flight vehicle 10, and the wing leading edges 16, 17, respectively, are sweptback sharply to provide a substantially delta wing plan form suitable for supersonic flight. In this connection, however, the invention is not specifically limited to such delta wing plan forms, but is also applicable to other high speed airfoil configurations. Therefore, while the invention is particularly well adapted for supersonic flight vehicles, and is specifically described in connection therewith, it is to be understood that this is by way of example only, and the invention is also applicable to other high speed craft, e.g., transonic vehicles or high speed subsonic vehicles, to improve the low speed aerodynamic performance characteristics of such craft.

A tail fin or vertical stabilizer 18 extends from the aft part of the fuselage 12 behind the wings 14, 15. In addition, a pair of horizontal stabilizers 20, 21 extend from the forward part of the fuselage 12 in a canard configuration ahead of the wings 14, 15. In this connection, while a canard structure has been shown for the flight vehicle 10 in FIGURE 1, other horizontal stabilizer locations along the fuselage 12, e.g., at the tail, may be utilized without in any way departing from the spirit and scope of the present invention.

A conventional rudder 22 is attached to the vertical stabilizer 18 at its trailing edge to provide yaw control for the flight vehicle 10.

A pair of conventional ailerons 24, 25 are attached to the outer trailing edges of the wings 14, 15 respectively, for controlling roll of the flight vehicle 10. In the absence of any elevator control surfaces on the horizontal stabilizers 20, 21, the ailerons 24, 25 may perform as dual-purpose control surfaces such as elevons or ailevators to control pitch as well as roll for the flight vehicle 10.

A pair of airfoils in the form of bridge members 26, 27 are mounted at the fuselage 12 and are adapted to be selectively extended from retracted storage positions within the fuselage to provide a bridge between the fuselage and the trailing edges 28, 29 of the wings 14, 15, respectively. Similarly, a second pair of bridge members 31, 32 selectively extend from opposite sides of the fuselage 12 to the trailing edges 34, 35 of the horizontal stabilizers 20, 21, respectively. Hence, it will be apparent that, while the trailing edge bridge member construction of the present invention is intended for use primarily in conjunction with the wings of a flight vehicle, the same principles may be applied to improve the aerodynamic performance characteristics of other airfoils, of the same flight vehicle. Therefore, the following discussion with respect to the effect of the bridge members 26, 27 upon the aerodynamic performance of the wings 14, 15 is also valid with respect to the effect of the bridge members 31, 32 upon the aerodynamic performance of the horizontal stabilizers 20, 21.

Referring now more particularly to FIGURES 1–4, the bridge members 26, 27 are normally stored in their retracted positions within the fuselage 12 (indicated in phantom in FIGURE 2) during high velocity cruising operation of the flight vehicle 10. However, rotation of the bridge members 26, 27 out of the fuselage 12 to any extended positions along the trailing edges 28, 29 of the wings 14, 15, respectively, during low speed operation of the flight vehicle 10 substantially enhances the low speed performance characteristics of the wings 14, 15 which are designed primarily for optimum aerodynamic performance at higher flight vehicle velocities.

The bridge members 26, 27 are not limited to the fully retracted and fully extended positions shown in FIGURE 2, but may assume any desired positions intermediate these two limiting positions. Moreover, the bridge members on opposite sides of the fuselage 12 need not be retracted or extended in synchronism, but can be individually operated so that the lift and drag on opposite sides of the fuselage can be varied for precise trimming of the craft during flight.

Each of the wing trailing edges 28, 29 is provided with an arcuate guide rail 36, 37, respectively, extending along the trailing edge and into the fuselage 12 on each side. The guide rails 36, 37 may be mounted at the trailing edges 28, 29 in any appropirate manner.

Each of the bridge members 26, 27 is adapted for movement along one of the guide rails 36, 37, respectively, by means of a roller 39 in engagement with the rail and mounted for rotation upon a shaft 40 (FIGURE 4) extending from the end of the bridge member adjacent the respective wing trailing edge.

The means for moving each of the bridge members 26, 27 to selected positions along the wing trailing edges 28, 29, respectively, is identical. In this connection, rotation of the bridge member 26 from its fully retracted position within the fuselage 12 to its fully extended position behind the wing 14 is accomplished by means of a mechanical actuator 41 within the fuselage 12. The actuator 41 is controlled by signals received over control lines 43 from a control console 45 (FIGURE 1) at any appropriate location within the fuselage. The control console 45 may be operated directly by a pilot, an automatic programing system, or by signals received from a ground command station.

The mechanical actuator 41 includes a motor 45 for rotating a translationally stationary ball nut or the like (not shown) which, in turn, induces translational movement of a lead screw 47. One end 49 of the lead screw 47 is pivotally coupled to one arm 51 of a bridge member bell crank 52, the other arm 53 of the bell crank being affixed to the end of the bridge member 26 adjacent the fuselage 12. The bell crank 52 is pivoted about a fixed point 55 in the fuselage 12. Hence, selective advancement of the lead screw 47 induces rotation of the bridge member 26 along the trailing edge 28 of the wing 14 to any desired position between full retraction and full extension.

As best observed in FIGURE 1, opposite sides of the fuselage 12 adjacent the bridge members 26, 27 are provided with trap doors or retractable panels for permitting the bridge members to enter and exit through appropriate openings in the sides of the fuselage.

It will be apparent in FIGURE 2 that, when the bridge members 26, 27 are retracted into the fuselage 12, the bridge members are completely removed from the main airstream and, hence, the additional lift and drag provided by the bridge members when in their extended positions are completely eliminated for high speed flight vehicle operation. Moreover, the arcuate trailing edges 28, 29 of the wings 14, 15, respectively, provide wing plan forms of smaller area and reduced root chord where the wings are joined to the fuselage 12. This results not only in reduced lift at high speeds, but also in less profile drag at each wing root. Hence, the high speed performance of the flight vehicle 10 is improved.

The particular airfoil cross-section (FIGURE 3) of each of the bridge members 26, 27 is selected to provide desirable aerodynamic characteristics in the extended positions of the bridge members. In this connection, leading edge slots (not shown) may be provided along the span length of each bridge member to further optimize the aerodynamic performance of each bridge member. The aerodynamic characteristics of the flight vehicle 10 may also be varied by varying the angle of attack of each of the bridge members 26, 27.

One manner in which the angle of attack of each bridge member can be varied is illustrated in FIGURE 2. The bridge member 26 includes an inner section 60 adjacent the fuselage 12 and having a fixed angle of attack. An outer bridge member section 62 extends between the inner section 60 and the trailing edge 28 of the wing 14. The bridge member section 62 is pivotally mounted for rotation about a hinge axis extending parallel to the longitudinal axis of the bridge member. A motor 64 is carried by the fixed bridge member section 60 and is coupled to the section 62 to selectively pivot the latter and thereby vary the angle of attack of the bridge member. The motor 64 receives energizing signals over control lines 66 from the control console 45.

In every extended position of the bridge member 26, a closed perimeter gap or air scoop is defined behind the wing 14 by its trailing edge 28, the leading edge 68 of the bridge member 26 and one side of the fuselage 12. The size of this closed perimeter gap is such that acceleration of air flow behind the wing 14 and around the bridge member 26 takes place. In this manner, trailing edge separation of flow at the rear portion of the wing 14 is delayed, with a consequent increase in lift not only due to the additional lifting surface provided by the bridge member 26 itself, but also due to the increased lifting efficiency of the primary lifting surface ahead of the bridge member.

FIGURES 5 and 6 illustrate lift and drag curves, respectively, obtained by performing wind tunnel tests upon one example of an airframe constructed in accordance with the present invention, and by performing the same tests upon an air frame which is identical except for the lack of a trailing edge bridge member defining a closed perimeter gap behind the wing. Lift curve $A_1$ in FIGURE 5 and drag curve $B_1$ in FIGURE 6 are representative of the airframe constructed in accordance with the present invention, whereas curves $A_2$ and $B_2$ are representative of the air frame without the trailing edge bridge member.

As observed in FIGURE 5, not only is the coefficient of lift ($C_L$) substantially increased with the improved airframe construction of the present invention, but the burble point or stalling angle is also increased from approximately 12° to approximately 28°. Similarly, the curves of FIGURE 6 indicate a substantial increase in the amount of drag obtainable with the airframe construction of the present invention. Yet, when the gap defining bridge members are removed from the airstream, there is a sharp reduction in both lift and drag which makes the airframe particularly well suited to operation in high vehicle velocity ranges.

The increased lift, drag and permissible maximum angle of attack facilitated by the retractable bridge member construction of the present invention provides a number of operating advantages. In this connection, landing, takeoff and climbing operations can be performed at much slower speeds, and shorter runways can be used for landing and takeoff in view of these reduced speed requirements. In addition, less power is required to obtain the same degree of lift and drag at low vehicle velocities. Furthermore, the airframe construction of the present invention safely compensates for assumed larger angles of attack during sinking speeds while landing, provides improved aerodynamic control during low velocity gliding flights under zero power, and enables a fuselage attitude during landing affording improved runway visibility.

Referring now to FIGURE 7, there is shown another embodiment of the invention in the form of a flying wing or re-entry type flight vehicle 110. The vehicle 110 utilizes a combined fuselage and wing 112 having sweptback leading edges 114, 116. Stabilizing control surfaces 118, 120 extend from the aft portion of the wing 112. The aft portion of the wing also includes a central, dovetail section 122. Arcuate trailing edges 124, 125 on opposite sides of the wing dovetail section 122 embody appropriate guide means of the same type illustrated for the trailing edge 28 in FIGURE 2 for guiding a pair of retractable bridge members 127, 128, respectively. The bridge members 127, 128 in FIGURE 7 correspond to the bridge members 26, 27 of the flight vehicle 10 shown in FIGURE 1 and enhance the low speed performance of the flight vehicle 110 in the same manner as the bridge members 26, 27 enhance the low speed performance of the flight vehicle 10. In this connection, the bridge members 127, 128 are retractable to storage positions (shown in phantom in FIGURE 7) within outer sections of the wing 112 during high speed operation of the flight vehicle 110. Appropriate drive means 130, 131 are actuated by suitable controls 133 within the wing 112 to selectively extend or retract the bridge members 127, 128.

The flight vehicle 210 shown in FIGURE 8 is similar to the flight vehicle 110 illustrated in FIGURE 7, except that the bridge members 227, 228 are stored in the central wing section 222 rather than in the outer wing sections. In this connection, reference numerals 212–233 for the flight vehicle 210 illustrated in FIGURE 8 denote like or corresponding elements designated by the reference numerals 112–133 for the flight vehicle 110 illustrated in FIGURE 7.

In the embodiment of the invention shown in FIGURE 9, a flight vehicle 310 is provided with a fuselage 312 and a pair of sweptback wings 314, 315 extending from opposite sides of the fuselage. A plurality of engine nacelles 317, 318, 319 are mounted upon the wing 314, and also upon the wing 315 (not shown). The flight vehicle 310 is provided with a plurality of retractable, trailing edge bridge members 321, 322, 323 and 324 to vary the aerodynamic characteristics of the flight vehicle during low speed operation. In this connection, the bridge members 323 and 324 adjacent the fuselage 312 can be retracted into the fuselage for storage, whereas provision is made for retracting more distant bridge members, such as 321 and 322, into adjacent nacelles.

The present invention satisfies a long existing need in the art for a relatively simple, economical and reliable means for improving the low speed aerodynamic performance of high speed airfoils. At the same time, the present invention also enhances high speed performance by reducing area, lift and drag during high speed operation.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. A flight vehicle, comprising:
 a lifting airfoil;
 retractable bridge means behind said airfoil for selectively defining a closed perimeter gap between the trailing edge of said airfoil and the leading edge of said bridge means;
 and means for varying the angle of attack of said bridge means.
2. A flight vehicle, comprising:
 a high speed airfoil;
 bridge means behind said airfoil and movable along the trailing edge of said airfoil for selectively defining a closed perimeter gap between the trailing edge of said airfoil and the leading edge of said bridge means;
 means for selectively retracting said bridge means to a position within a portion of said flight vehicle, whereby said bridge means is removed from the airstream behind said airfoil;
 and means for varying the angle of attack of said bridge means.
3. In a flight vehicle, the combination comprising:
 a sweptback airfoil;
 bridge means located behind said airfoil and movable along the trailing edge thereof for selectively defining a closed perimeter gap between the trailing edge of said airfoil and the leading edge of said bridge means such that the trailing edge separation of flow at said airfoil is delayed;
 means for selectively retracting said bridge means to a position within a portion of said flight vehicle;
 and means for varying the angle of attack of said bridge means.
4. A flight vehicle, comprising:
 a fuselage;
 a pair of high speed airfoils extending from opposite sides of said fuselage;
 bridge means behind each airfoil and extending between said fuselage and the trailing edge of each airfoil to selectively define a closed perimeter gap between the trailing edge of each airfoil and the leading edge of the associated bridge means;
 and means for selectively retracting said bridge means into said fuselage, whereby each bridge means is removed from the airstream.
5. A flight vehicle, comprising:
 a fuselage;
 a pair of high speed airfoils extending from opposite sides of said fuselage, each of said airfoils having a root chord which is less than the maximum airfoil chord;
 a bridge member behind each airfoil and extending between said fuselage and the trailing edge of each airfoil to selectively define a closed perimeter gap of such size that the trailing edge separation of flow for each airfoil is delayed;
 and means for selectively retracting each bridge member into said fuselage to remove each bridge member from the airstream behind the associated airfoil, whereby lift and drag are reduced during high speed operation of said flight vehicle.
6. In a flight vehicle, the combination comprising:
 a fuselage;
 at least one pair of sweptback airfoils extending from opposite sides of said fuselage, each of said airfoils having a root chord which is less than the maximum chord of the particular airfoil;
 guide means mounted at the trailing edge of each of said airfoils;
 a bridge member behind each airfoil and extending between said fuselage and said guide means for selectively defining a closed perimeter gap between the trailing edge of each airfoil and the leading edge of the associated bridge member such that the trailing edge separation of flow for each airfoil is delayed by the associated bridge member;
 and actuator means for moving each bridge member along said guide means in the airstream behind the associated airfoil and for selectively retracting each bridge member into said fuselage and out of the airstream behind the respective airfoil.
7. In a flight vehicle, the combination comprising:
 a fuselage;
 a pair of sweptback airfoils extending from opposite sides of said fuselage, each of said airfoils having a root chord which is less than the maximum chord of the particular airfoil;
 guide means mounted at the trailing edge of each of said airfoils;
 a bridge member behind each airfoil and extending between said fuselage and said guide means for selectively defining a closed perimeter gap between the trailing edge of each airfoil and the leading edge of the associated bridge member such that the trailing edge separation of flow for each airfoil is delayed by its associated bridge member;
 actuator means for moving each bridge member along said guide means in the airstream behind the associated airfoil and for selectively retracting each bridge member into said fuselage and out of the airstream behind the respective airfoil;
 and means for selectively varying the angle of attack of each bridge member.
8. A flight vehicle, comprising:
 a fuselage;
 a pair of sweptback wings extending from opposite sides of said fuselage;
 a guide rail along the trailing edge of each wing;
 an airfoil bridge member behind each wing and extending between the guide rail of that particular wing and said fuselage to selectively define a closed perimeter gap between the trailing edge of each wing, the associated bridge member and said fuselage such that trailing edge separation of flow is delayed by each bridge member for the wing ahead of the particular bridge member;
 and actuator means for moving each bridge member along the guide rail of the associated wing in the airstream behind the associated wing and for selectively retracting each bridge member into a portion of said flight vehicle to remove the bridge member from the airstream behind the associated wing.
9. In a flight vehicle, the combination comprising:
 a fuselage;

a pair of sweptback wings extending from opposite sides of said fuselage;
a guide rail along the trailing edge of each wing;
an airfoil bridge member behind each wing and extending between the guide rail of that particular wing and said fuselage to selectively define a closed perimeter gap between the trailing edge of each wing, the associated bridge member and said fuselage;
and actuator means for moving each bridge member along the guide rail of the associated wing in the airstream behind the associated wing and for selectively retracting each bridge member into said fuselage.

10. A flight vehicle, comprising:
a fuselage;
a pair of sweptback wings extending from opposite sides of said fuselage, each of said wings having a root chord which is less than the maximum wing chord;
a guide rail along the trailing edge of each wing;
an airfoil bridge member behind each wing and extending between the guide rail of that particular wing and said fuselage to selectively define a closed perimeter gap between the trailing edge of each wing, the associated bridge member and said fuselage;
actuator means for moving each bridge member along the guide rail of the associated wing in the airstream behind the associated wing and for selectively retracting each bridge member into said fuselage to remove the bridge member from the airstream behind the associated wing;
and means for selectively varying the angle of attack of each bridge member.

11. A flight vehicle, comprising:
a fuselage;
a pair of sweptback wings extending from opposite sides of said fuselage, each of said wings having a root chord which is less than the maximum wing chord;
a substantially arcuate guide rail along the trailing edge of each wing;
an airfoil bridge member behind each wing and extending between the guide rail of that particular wing and said fuselage to selectively define a closed perimeter gap between the trailing edge of each wing, the associated bridge member and said fuselage such that trailing edge separation of flow is delayed by each bridge member for the wing ahead of the particular bridge member;
actuator means for rotating each bridge member along the guide rail of the associated wing in the airstream behind the associated wing and for selectively retracting each bridge member from said airstream and into said fuselage;
panel means on each side of said fuselage for permitting each bridge member to enter and exit from said fuselage;
and means for varying the angle of attack of each bridge member.

12. A flight vehicle, comprising:
a sweptback wing;
a pair of guide rails along the trailing edges of said wing;
a pair of airfoil bridge members behind said trailing edges, each bridge member being in engagement with one of said guide rails and selectively defining a closed perimeter gap behind the particular guide rail such that the trailing edge separation of flow at the wing surface ahead of the particular bridge member is delayed;
actuator means for rotating each bridge member along the associated guide rail in the airstream behind said wing and for selectively retracting each bridge member from the airstream into said wing;
and means for varying the angle of attack of each bridge member.

13. In a flight vehicle, the combination comprising:
a high speed airfoil;
at least one nacelle mounted upon said airfoil;
an airfoil bridge member behind said high speed airfoil and extending between said nacelle and the trailing edge of said high speed airfoil to define a closed perimeter gap between said trailing edge of said high speed airfoil, the leading edge of said bridge member and said nacelle such that trailing edge separation of flow for the airfoil area ahead of said bridge member is delayed;
and means for selectively retracting said bridge member into said nacelle.

14. A flight vehicle, comprising:
a sweptback wing;
at least one nacelle mounted upon said wing;
an airfoil bridge member behind said wing and extendable between said nacelle and the trailing edge of said wing to selectively define a closed perimeter between the trailing edge of said wing, the leading edge of said bridge member and said nacelle;
means for selectively rotating said bridge member along said leading edge of said wing to retract said bridge member into said nacelle, whereby said bridge member is removed from the airstream behind said wing;
and means for varying the angle of attack of said bridge member.

References Cited by the Examiner
UNITED STATES PATENTS

| | | | |
|---|---|---|---|
| 2,194,596 | 3/1940 | Henter | 244—13 |
| 2,241,196 | 5/1941 | Gerin | 244—43 |
| 2,406,625 | 8/1946 | Oglesby | 244—13 |
| 3,104,082 | 9/1963 | Polhamus | 244—43 |

FOREIGN PATENTS 745,281 2/1956 Great Britain.

MILTON BUCHLER, *Primary Examiner.*
B. BELKIN, *Assistant Examiner.*